United States Patent
Miao et al.

(10) Patent No.: US 9,325,466 B2
(45) Date of Patent: Apr. 26, 2016

(54) SIGNALING FOR EPDCCH RESOURCE MAPPING IN THE SUPPORT OF COMP

(75) Inventors: Honglei Miao, Espoo (FI); Pekka Janis, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 374 days.

(21) Appl. No.: 13/566,111

(22) Filed: Aug. 3, 2012

(65) Prior Publication Data
US 2014/0036789 A1 Feb. 6, 2014

(51) Int. Cl.
H04L 5/00 (2006.01)
H04W 72/04 (2009.01)
H04B 7/02 (2006.01)

(52) U.S. Cl.
CPC .............. *H04L 5/0035* (2013.01); *H04L 5/005* (2013.01); *H04L 5/0094* (2013.01); *H04W 72/04* (2013.01); *H04B 7/024* (2013.01); *H04L 5/006* (2013.01); *H04L 5/0023* (2013.01); *H04L 5/0057* (2013.01)

(58) Field of Classification Search
USPC ........................................................ 370/329
See application file for complete search history.

(56) References Cited

U.S. PATENT DOCUMENTS

| 2011/0026473 | A1* | 2/2011 | Luo ....................... H04L 5/0035 370/329 |
| 2011/0170496 | A1 | 7/2011 | Fong et al. |
| 2011/0235603 | A1* | 9/2011 | Cheng et al. ................. 370/329 |
| 2012/0176884 | A1* | 7/2012 | Zhang et al. ................. 370/203 |
| 2012/0281636 | A1* | 11/2012 | Xiao et al. ..................... 370/329 |
| 2013/0039284 | A1* | 2/2013 | Marinier ................ H04L 5/001 370/329 |
| 2013/0039291 | A1 | 2/2013 | Blankenship et al. |
| 2013/0114431 | A1* | 5/2013 | Koivisto ................ H04B 7/024 370/252 |
| 2013/0301542 | A1* | 11/2013 | Krishnamurthy ..... H04W 52/50 370/329 |

OTHER PUBLICATIONS

3GPP TSG RAN WG1 Meeting #69, R1-122308, "Discussion on eREG/eCCE Definition", LG Electronics, Prague, Czech Republic, May 21-25, 2012, 8 pages.
3GPP TSG RAN WG1 Meeting #68bis, R1-120993, "Scrambling Sequence for ePDCCH Detection", Huawei, JeJu, Korea, Mar. 26-30, 2012, 5 pages.
3GPP TSG RAN WG1 Meeting #69, R1-122427, "Control Channel Region for ePDCCH", Nokia, Nikia Siemens Networks, Prague, Czech Republic, May 21-25, 2012, 4 pages.
International Search Report and Written Opinion international application No. PCT/FI2013/050610 dated Sep. 24, 2013.
First Office Action dated May 22, 2015, issued in corresponding Taiwanese Patent Application No. 102122715.
Supplementary European Search Report dated Mar. 4, 2016 corresponding to European Patent Application No. 13826009.6.
Apple Inc.: "On the Structure and Usage Scenarios of ePDCCH," 3GPP Draft; R1-114300, 3GPP TSG RAN WG1 Meeting #67, San Francisco, USA, Nov. 14-18, 2011, Nov. 9, 2011, XP050562351, pp. 1-9.

(Continued)

*Primary Examiner* — Robert M Morlan
(74) *Attorney, Agent, or Firm* — Squire Patton Boggs (US) LLP (57) ABSTRACT

Communication systems may benefit from signaling for resource mapping. For example, third generation partnership project (3GPP) long term evolution advanced (LTE-Advanced) may benefit from signaling for enhanced downlink control channel (ePDCCH) resource mapping in support of coordinated multipoint (CoMP) transmission.

17 Claims, 6 Drawing Sheets

(56) References Cited

OTHER PUBLICATIONS

Nokia et al.: "Multiplexing of ePDCCH for different users," 3GPP Draft; R1-121288, 3GPP TSG RAN WG1, Meeting #68bis, Jeju, Korea, Mar. 26th-30th, 2012, Mar. 20, 2012, XP050599578, 7 pages.

Nokia et al.: "CCE and REG definitions for ePDCCH," 3GPP Draft; R1-122423, 3GPP TSG RAN WG1 Meeting #69, Prague, Czech, May 21st-25th, 2012, May 12, 2012, XP050600678, 6 pages.

Alcatel-Lucent et al.: "Search Space for ePDCCH," 3GPP Draft; R1-114065, 3GPP TSG RAN WG1 Meeting #67, San Francisco, USA, Nov. 14th-18th, 2011, Nov. 10, 2011, XP050562400, 2 pages.

* cited by examiner

SIGNALING FOR EPDCCH RESOURCE MAPPING IN THE SUPPORT OF COMP

BACKGROUND

1. Field

Communication systems may benefit from signaling for resource mapping. For example, third generation partnership project (3GPP) long term evolution advanced (LTE-Advanced) may benefit from signaling for enhanced downlink control channel (ePDCCH) resource mapping in support of coordinated multipoint (CoMP) transmission.

2. Description of the Related Art

Among considerations with respect to an enhanced downlink (DL) control channel are consideration regarding the enhanced physical downlink control channel (ePDCCH) coding chain rate-matching is used around the common reference signal (CRS), PDCCH region and PBCH/PSS/SSS as follows. For example, it may be that a resource element (RE) that collides with any other signal is not used for ePDCCH. Moreover, coding chain rate-matching may be used around a CRS, a new antenna port on new carrier type (NCT), a region up to the physical downlink shared channel (PDSCH) starting position, and/or a physical broadcast channel (PBCH) and primary synchronization signal/secondary synchronization signal (PSS/SSS) if ePDCCH transmission in these physical resource block (PRB) pairs is supported.

The positions of these signals listed above may be known to the UE when the ePDCCH is transmitted from a single transmission point (TP). However, in some scenarios, similar to the data channel PDSCH, the ePDCCH may also benefit from cooperative multiple point transmission (CoMP). The CoMP support for the PDSCH typically operates in a transparent manner to the UE.

Control signaling support for the CoMP operation and ongoing ePDCCH design may need to be compatible. Moreover, to have a future proof ePDCCH design, the design may need to take into account the potential CoMP support for the ePDCCH. When the ePDCCH employs any CoMP scheme, such as joint transmission (JT) or dynamic point selection (DPS) in scenarios where the cooperating transmission points (TP) have a different cell ID, the user equipment (UE) may need to know the position of the CRS and PDCCH region for each ePDCCH blind decoding candidate.

This is not a problem for scenarios where the cooperating TPs have the same shared cell ID. In such a case, CRS positions and the PDCCH region for all transmission points are same. In a CoMP scenario, with a Macro-Pico type heterogeneous network (HetNet), assuming that the DPS is used for the ePDCCH, in one subframe the ePDCCH may be transmitted from the Marco cell, then REs used for e.g. the CRSs of the Macro cell may need to be mapped around. In another subframe, the ePDCCH may be transmitted from the Pico cell, and accordingly the REs used for e.g. CRSs of the Pico cell may need to be mapped around for the ePDCCH. If the JT from both the Macro and Pico is applied, then the REs used for e.g. CRSs of both cells may need to be mapped around.

One approach solving the problem for the PDSCH case is to provide to the UE the positions of other signals such as CRS for the PDSCH resource mapping with CoMP operation. The downlink control information (DCI) carried by the PDCCH or ePDCCH would be used to provide the CRS positions to the UE. However, such an approach is not possible for the ePDCCH with CoMP operation, since the DCI is only accessible to the UE after it correctly decodes the ePDCCH. However, due to the coding chain rate matching approach, the CRS position information to decode the ePDCCH.

Currently the resource mapping around CRS is necessary for ePDCCH does not yet take into account the potential CoMP support. Thus, there are no existing approaches for coping with the CRS and PDCCH region signaling to support the CoMP operation for ePDCCH.

SUMMARY

According to certain embodiments, a method includes receiving an association between physical resource block resources and at least one of a plurality of transmission points in a cooperative multipoint system. The method also includes decoding an enhanced physical downlink control channel based on the association.

In certain embodiments, a method includes determining an association between physical resource block resources and at least one of a plurality of transmission points in a cooperative multipoint system. The method also includes transmitting the association to a user equipment.

An apparatus, in certain embodiments, includes at least one processor and at least one memory including computer program code. The at least one memory and the computer program code are configured to, with the at least one processor, cause the apparatus at least to receive an association between physical resource block resources and at least one of a plurality of transmission points in a cooperative multipoint system. The at least one memory and the computer program code are also configured to, with the at least one processor, cause the apparatus at least to decode an enhanced physical downlink control channel based on the association.

An apparatus, according to certain embodiments, includes at least one processor and at least one memory including computer program code. The at least one memory and the computer program code are configured to, with the at least one processor, cause the apparatus at least to determine an association between physical resource block resources and at least one of a plurality of transmission points in a cooperative multipoint system. The at least one memory and the computer program code are also configured to, with the at least one processor, cause the apparatus at least to transmit the association to a user equipment.

According to certain embodiments, an apparatus includes receiving means for receiving an association between physical resource block resources and at least one of a plurality of transmission points in a cooperative multipoint system. The method also includes decoding means for decoding an enhanced physical downlink control channel based on the association.

In certain embodiments, an apparatus includes determining means for determining an association between physical resource block resources and at least one of a plurality of transmission points in a cooperative multipoint system. The apparatus also includes transmitting means for transmitting the association to a user equipment.

A non-transitory computer readable medium is, in certain embodiments, encoded with instructions that, when executed in hardware perform a process. The process includes receiving an association between physical resource block resources and at least one of a plurality of transmission points in a cooperative multipoint system. The process also includes decoding an enhanced physical downlink control channel based on the association.

A non-transitory computer readable medium is, according to certain embodiments, encoded with instructions that, when executed in hardware perform a process. The process includes determining an association between physical resource block resources and at least one of a plurality of transmission points in a cooperative multipoint system. The process also includes transmitting the association to a user equipment.

BRIEF DESCRIPTION OF THE DRAWINGS

For proper understanding of the invention, reference should be made to the accompanying drawings, wherein.

DETAILED DESCRIPTION

Certain embodiments provide methods and devices for search space design to support cooperative multipoint (CoMP) operation for an enhanced physical downlink control channel (ePDCCH). Moreover, certain embodiments address how a user equipment (UE) may be informed about the common reference signal (CRS) positions and physical downlink control channel (PDCCH) region of different transmission points (TPs).

In certain embodiments, for the CoMP capable UE, the CRS positions and PDCCH region of each transmission point (TP) in the CoMP set may be signaled to the UE before any CoMP scheme is applied. The UE may only monitor the physical control format indicator channel (PCFICH) of its anchor serving TP. Thus, the PDCCH regions of other TPs than the anchor serving TP in the CoMP set may be semi-statically configured to the UE. Such dedicated configuration/reconfiguration message may be signaled to the UE via radio resource control (RRC) signaling scheduled by PDCCH or fallback ePDCCH without CoMP operation.

According to certain embodiments, an ePDCCH search space is designed, in which each CoMP-ePDCCH candidate includes the information that defines the set of the transmit points to be used for CoMP-ePDCCH transmission. For instance, if there are two TPs in the CoMP cluster, an information element of two bits may indicate which TPs are associated with a particular CoMP-ePDCCH candidate. After UE correctly receives the ePDCCH search space configuration by dedicated RRC signaling which includes all the possible ePDCCH candidates (both CoMP- and non-CoMP candidates), it may have knowledge about the TP set of each CoMP-ePDCCH candidate. According to the above information element about the TP set for the CoMP-ePDCCH candidate, the UE may know which CRS positions and PDCCH region are to be mapped around for this CoMP-ePDCCH candidate.

In the preceding embodiment, each CoMP-ePDCCH candidate may have a fixed set of TPs, and such method may be very suitable to the localized ePDCCH, which spans consecutive physical resource block (PRB) pairs. However, in addition to the localized ePDCCH, a distributed ePDCCH may also be used in third generation partnership project (3GPP) to achieve frequency/interference diversity. As such, a frequency selective DPS might be beneficial to the distributed ePDCCH in the support of CoMP. This implies that for a distributed CoMP-ePDCCH spanning over multiple separate PRB pairs, the parts of the ePDCCH transmission in different PRB pairs could be transmitted from different TPs.

Additionally, the eNBs in the CoMP cluster may jointly partition the PRBs, and may allocate them to their respective ePDCCH resources. Such partition/control resource allocation may be performed according to certain system performance criteria, which may take into account the control load requirement(s) for each TP, the blocking probability target of control channels for each TP, and so on. The resulting partitions may be fully orthogonal to each other to realize inter-cell interference coordination (ICIC) for the ePDCCHs associated with different TPs. The partitions may also partially overlap to reduce the control overhead. Moreover, the overlapped part may be used for the JT-based CoMP scheme, if configured. The frequency selective DPS may provide diversity transmission across the transmission points.

Multiple channel state information reference signals (CSI-RSs) may be configured to a UE to report the channel state information of multiple TPs. Based on the subband channel quality indicator (CQI) report of each TP from the UE, to support frequency selective DPS, the eNBs in a CoMP cluster may select which TP in a subband to be used to transmit the respective part of a distributed CoMP-ePDCCH, for example, the one which has the best CQI in the subband, As such, a CoMP-ePDCCH scheduler may be shared by the eNBs in the CoMP cluster. This scheduler may have access to the UEs' CSI reports about different TPs and the UEs' ePDCCH search spaces. The CoMP-ePDCCH scheduler may determine which PRB/TPs are to be used for a CoMP-ePDCCH candidate. Given the decision made by the CoMP-ePDCCH scheduler, each TP may transmit the respective parts of a distributed CoMP-ePDCCH.

Thus, in another embodiment, the eNode B (eNB) may inform the UE about the association between the PRB resources and the TP. Such information may be signaled to the UE by some dedicated high layer signaling. In this case, upon receiving the ePDCCH search space configuration, the UE may know the PRB resources and associated TP of each ePDCCH candidate. Once the UE learns which TPs are associated with each part of the ePDCCH, the UE may figure out which CRS positions and PDCCH region should be mapped around for each part of the CoMP-ePDCCH.

In addition to the signaling support discussed herein, also the demodulation reference signal (DMRS) sequence initialization may be signaled to the UE as a part of the search space configuration. The DMRS configuration may also be applied per ePDCCH candidate and/or per PRB pair.

It is also possible to combine the embodiments described above. For example, the UE specific ePDCCH search space can include both localized and distributed ePDCCHs. The different localized ePDCCHs may be associated with different TPs. Moreover, some distributed ePDCCHs may contain PRB resources associated with different TPs.

One specific embodiment for localized ePDCCHs may be implemented in a Macro-Pico heterogeneous network (Hetnet) scenario. In this scenario, the UE ePDCCH search space may be configured to include three types of ePDCCH candidates to support CoMP, including JT. A first type of candidate may be those transmitted from Macro node only. A second type of candidate may be those transmitted from Pico node only. A third type of candidate may be those transmitted from both Macro and Pico node. Another possibility is that only the first two types of candidates are configured to support DPS only. In any subframe, the eNB may select any type of ePDCCH within these three types to support dynamic CoMP operation. If the UE knows the physical resources and associated TPs of each ePDCCH candidate, then the UE may also know which CRS positions and PDCCH region should be mapped around.

A search space based on this method may be configured as follows. The number of ePDCCHs associated with TP1 is x, while y denotes the number of ePDCCHs associated with TP2, and z stands for the sum of x and y. For instance, the eNB may configure the above z ePDCCHs in total to the UE's search space (SS) via high layer signaling. It should be noted that the number z determines the total number of blind decoding attempts to be performed by the UE, so it is important to remain the value of z to a reasonable level to save the UE complexity. It is fully up to eNB to configure each UE's SS, moreover, the SS may be reconfigured according to the variation of the large-scale channel property. In the preceding example, the values of x and y may be different for different UE's SS, and the physical resource overlapping among these UEs' SS is controlled by the eNB. By doing so, this method may realize the control load balancing between different TPs. As such, the blocking probability may be improved by a smart SS configuration with tunable parameters x and y.

One embodiment for distributed ePDCCHs may be that in the Macro-Pico scenario, the eNB partitions the ePDCCH physical resources into two subsets, one is associated with the Macro cell, and the other is associated with the Pico cell. When these two subsets have overlapped elements, the intersection of these two subsets can contain those resources that will be used by both the Macro and the Pico simultaneously, for example to support JT. In such a way, frequency domain ICIC may be supported for the ePDCCH transmission between the Macro and Pico cells. For a particular CoMP UE, the eNB may configure the UE ePDCCH search space to include some ePDCCH candidates that utilize the physical resources from both subsets to support frequency selective DPS. Thus, part of one ePDCCH may be transmitted from the Macro node, and other part of this ePDCCH may be transmitted from the Pico node. Since the association between the physical resources and TPs is signaled to the UE, so UE has the knowledge about the CRS positions and PDCCH region to be mapped around.

Figure 1:
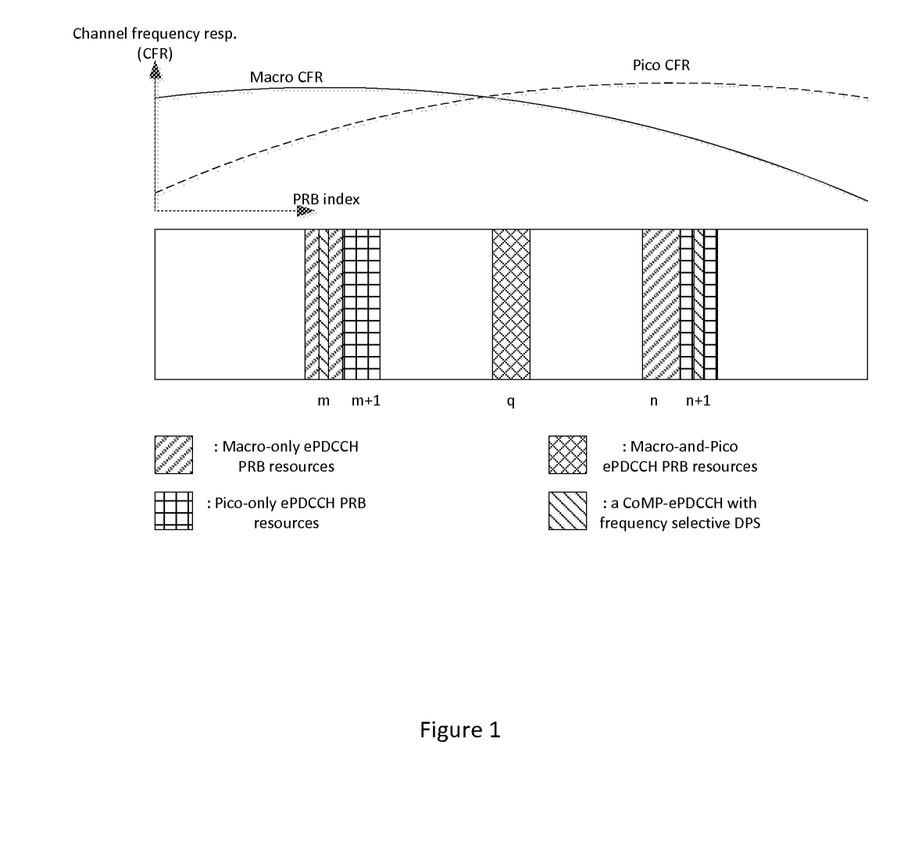
FIG. 1 illustrates ePDCCH transmission with frequency selective DPS in a Macro-Pico scenario, according to certain embodiments.

FIG. 1 illustrates ePDCCH transmission with frequency selective DPS in a Macro-Pico scenario, according to certain embodiments. As shown in FIG. 1, the Macro ePDCCH resources may include a first PRB q and second PRBs of indexes m and n. Moreover, the Pico ePDCCH resources may include first PRB q and third PRBs of indexes m+1 and n+1. The frequency domain ICIC may be achieved for the Macro and Pico ePDCCHs. The JT based CoMP scheme may be applied if the ePDCCH is transmitted by using first PRB q. It is further shown in FIG. 1 that the second ePDCCH may be transmitted over PRB m and n+1. Thus, the frequency selective DPS may be employed for this ePDCCH. The channel frequency response (CFR) over the PRB m from the Macro node to the UE may be better than that from the Pico node, on the contrary, the CFR over the PRB n from the Pico node to the UE may be better than that from the Macro node.

In the above example, the distributed CoMP-ePDCCH may be transmitted over PRBs (a, b) where a in {m, m+1}, and b in {n, n+1}. The conventional DPS could use different TPs in different subframes, but only one selected TP may be used in a certain subframe. As such, the possible distributed CoMP-ePDCCHs based on conventional DPS are (m, n) from Macro node and (m+1, n+1) from Pico node. The conventional DPS may select one out of two possible candidates which would experience a better SNR.

However, the possible distributed CoMP-ePDCCHs based on frequency selective DPS are (m, n), (m+1, n), (m, n+1) and (m+1, n+1). As such, the frequency selective DPS may select one out of four possible candidates, which could be based on which candidate is expected to experience the best signal to noise ratio (SNR).

Figure 2:
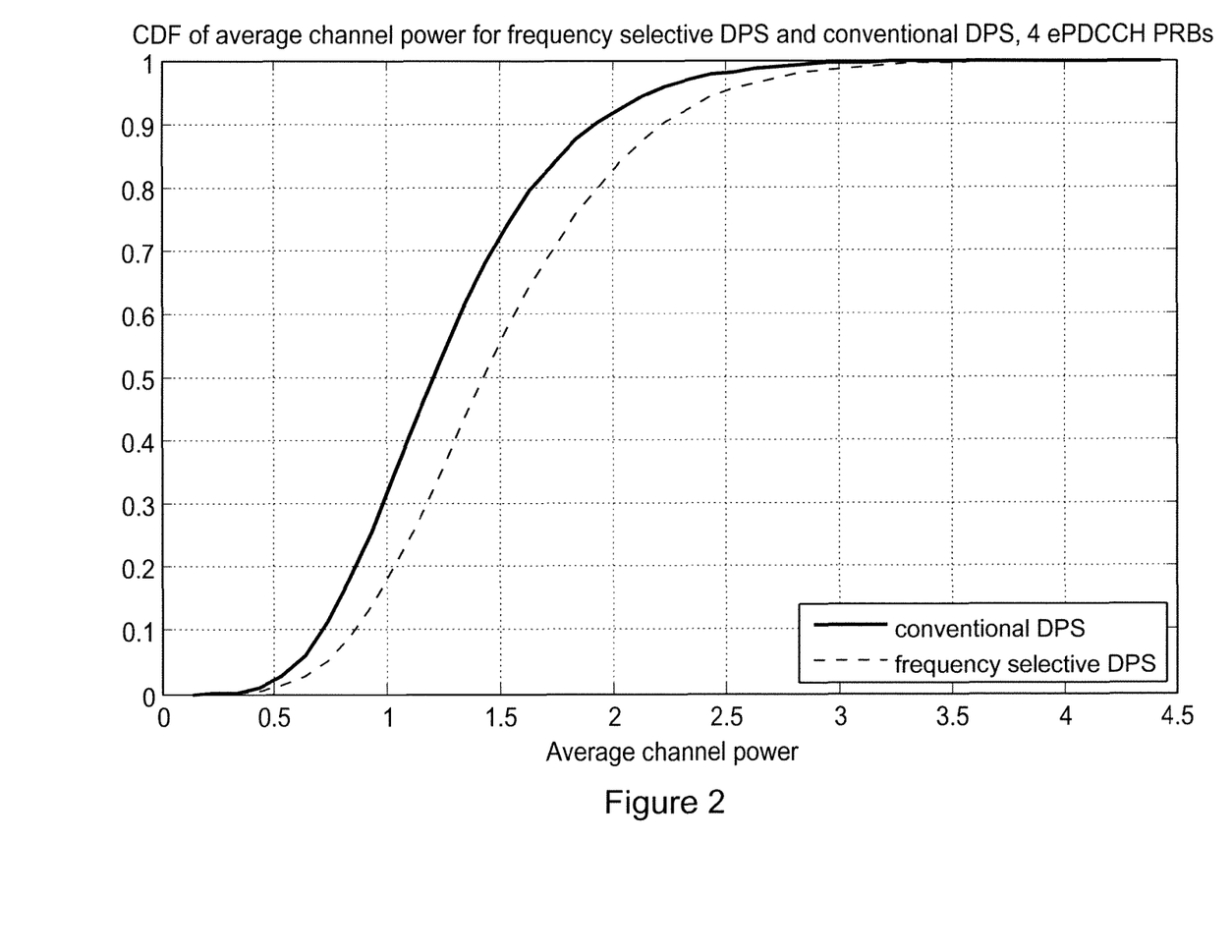
FIG. 2 illustrates a CDF of average channel power for frequency selective DPS and conventional DPS, with four ePDCCH PRBs for both Macro and Pico nodes.

The frequency selective DPS may transmit, in parts, the ePDCCH in FIG. 1 from both Macro TP and Pico TP. Because of frequency domain packet scheduling gain, the frequency selective DPS may outperform the conventional DPS in which a single TP is used for the whole frequency band. As shown in FIG. 2, the channel power of the frequency selective DPS may be superior to conventional DPS.

FIG. 2 illustrates a cumulative distribution function (CDF) of average channel power for frequency selective DPS and conventional DPS, with four ePDCCH PRBs for both Macro and Pico nodes. In this figure, the line for the conventional DPS is the line to the left of the line for frequency selective DPS. As shown in FIG. 2, from an average channel power of about 0.5 to an average channel power of about 3, the CDF of the frequency selective DPS is less than the CDF of conventional DPS.

Figure 3:
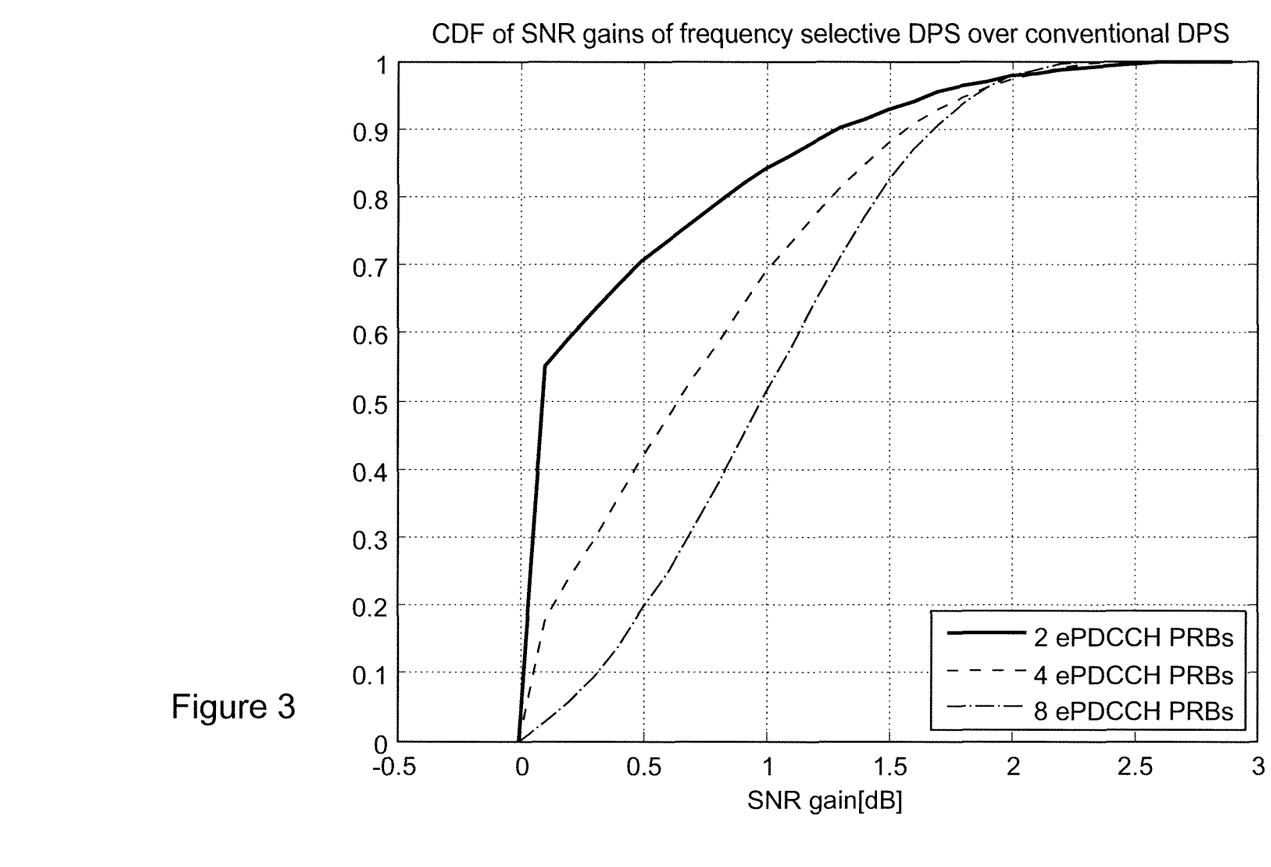
FIG. 3 illustrates a CDF of the SNR gains of frequency selective DPS over the conventional DPS.

Furthermore, the CDF of the SNR gains based on the frequency selective DPS over the conventional DPS is shown in FIG. 3. As shown in FIG. 3, the leftmost line represents two ePDCCH PRBs, the center line represents four ePDCCH PRBs, and the rightmost line represents eight ePDCCH PRBs.

As mentioned above, the SNR gains shown in FIGS. 2 and 3 may be due to the additional degree of freedom introduced from the additional transmit diversity by the different TPs for each ePDCCH PRB.

Certain embodiments may enable any coordinated multipoint (CoMP) scheme, dynamic point selection (DPS) or joint transmission (JT), to be supported for enhanced physical downlink control channel (ePDCCH). Certain embodiments, moreover, may control load balancing between different transmission points (TPs). Additionally, in certain embodiments blocking probability of ePDCCHs may be improved.

Figure 4:
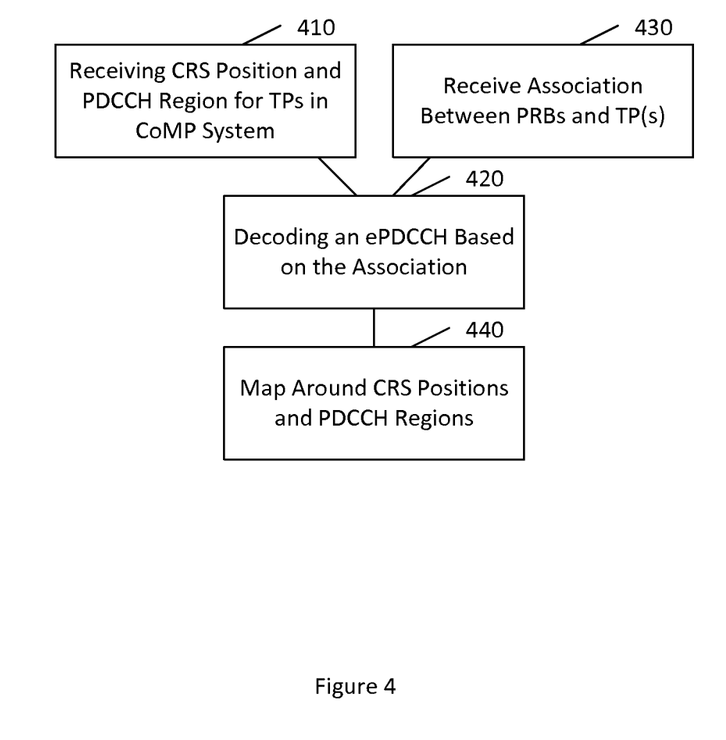
FIG. 4 illustrates a method according to certain embodiments.

FIG. 4 illustrates a method according to certain embodiments. The method may be performed by, for example, a user equipment. As shown in FIG. 4, a method may include, at 410, receiving a common reference signal position and a physical downlink control channel region for each of a plurality of transmission points in a cooperative multipoint system. The method may include, at 430, receiving an association between physical resource block resources and at least one of the plurality of transmission points. The association may be related to a search space of an enhanced physical downlink control channel.

The method may also include, at 420, decoding an ePDCCH based on the association.

The method may additionally include at, 440, mapping around a plurality of common reference signal positions and physical downlink control channel regions based on the association, when decoding the ePDCCH.

Figure 5:
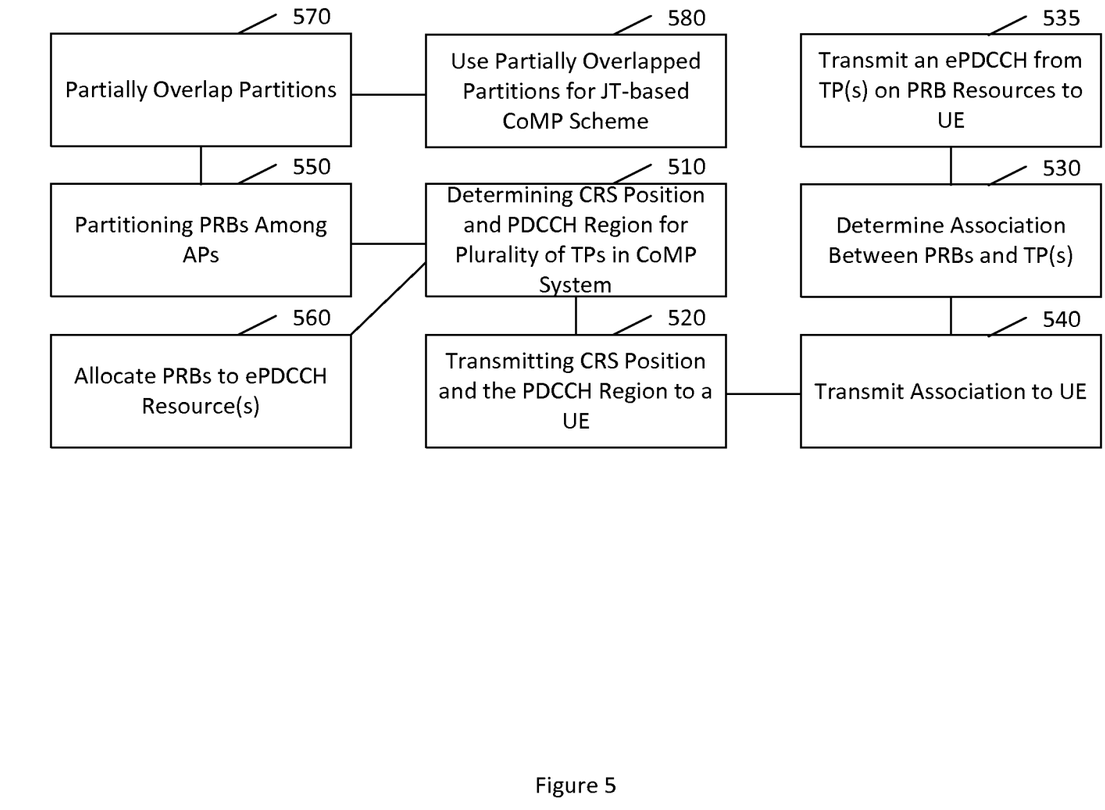
FIG. 5 illustrates another method according to certain embodiments.

FIG. 5 illustrates another method according to certain embodiments. The method may be performed by an access point, such as an eNodeB or a base station. The method includes, at 510, determining a common reference signal position and a physical downlink control channel region for each of a plurality of transmission points in a cooperative multipoint system. The method also includes, at 520, transmitting the common reference signal positions and the physical downlink control channel regions to a user equipment.

The method also includes, at 530, determining an association between physical resource block resources and at least one of the plurality of transmission points. The method also includes, at 535, transmitting, by the associated at least one of the plurality of transmission points, an ePDCCH on the physical resource block resources to the user equipment. The method may additionally include, at 540, transmitting the association to the user equipment. The association may be related to a search space of an enhanced physical downlink control channel.

The method may also include, at 550, partitioning physical resource blocks with at least one access point, wherein the determining the common reference signal positions and the physical downlink control channel regions is based on the partitioning Moreover, the method may include, at 560, allocating physical resource blocks to enhanced physical downlink control channel resources, wherein the determining the common reference signal positions and the physical downlink control channel regions is based on the allocating.

The method may further include, at 570, partially overlapping partitions of the physical resource blocks. The method may additionally include, at 580, using the partially overlapped partitions for a joint transmission based cooperative multipoint scheme.

Figure 6:
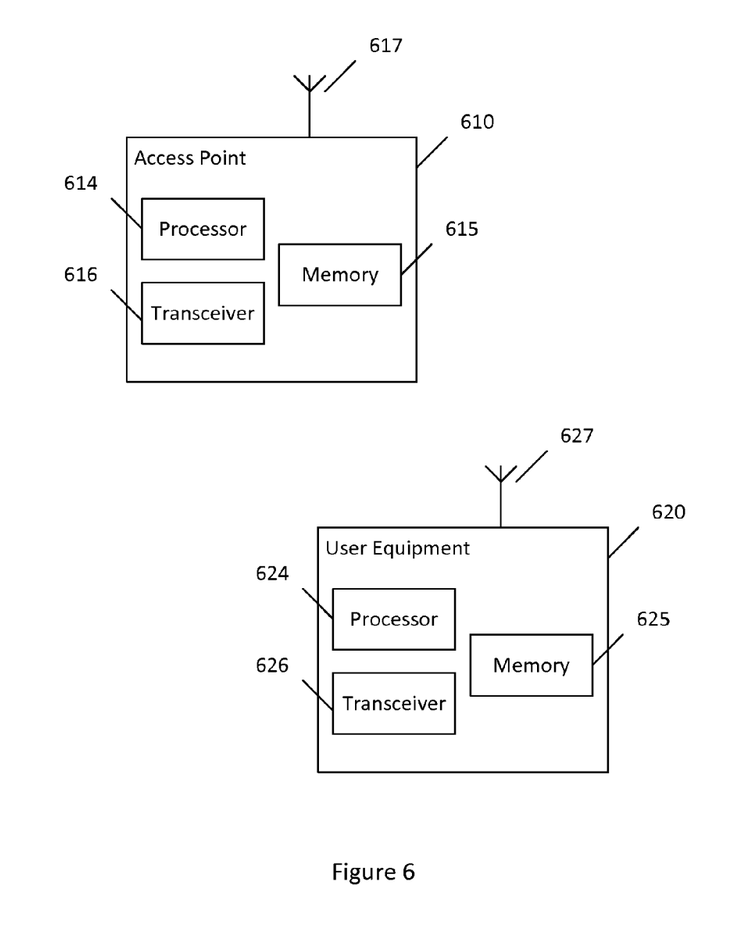
FIG. 6 illustrates a system according to certain embodiments of the invention.

FIG. 6 illustrates a system according to certain embodiments of the invention. In one embodiment, a system may comprise several devices, such as, for example, access point 610 and UE 620. The system may comprise more than one UE 620 and more than one access point 610, although only one of each is shown for the purposes of illustration. The system may also involve only at least two UEs 620 or only at least two access points 610. Each of these devices may comprise at least one processor, respectively indicated as 614 and 624. At least one memory may be provided in each device, and indicated as 615 and 625, respectively. The memory may comprise computer program instructions or computer code contained therein. One or more transceiver 616 and 626 may be provided, and each device may also comprise an antenna, respectively illustrated as 617 and 627. Although only one antenna each is shown, many antennas and multiple antenna elements may be provided to each of the devices. Other configurations of these devices, for example, may be provided. For example, access point 610 and UE 620 may be additionally configured for wired communication, in addition to wireless communication, and in such a case antennas 617 and 627 may illustrate any form of communication hardware, without being limited to merely an antenna.

Transceivers 616 and 626 may each, independently, be a transmitter, a receiver, or both a transmitter and a receiver, or a unit or device that may be configured both for transmission and reception.

Processors 614 and 624 may be embodied by any computational or data processing device, such as a central processing unit (CPU), application specific integrated circuit (ASIC), or comparable device. The processors may be implemented as a single controller, or a plurality of controllers or processors.

Memories 615 and 625 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 610 and UE 620, to perform any of the processes described above (see, for example, FIGS. 1-5). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 6 illustrates a system including an access point 610 and a UE 620, embodiments of the invention may be applicable to other configurations, and configurations involving additional elements, as illustrated and discussed herein. For example, multiple user equipment devices and multiple access points may be present, or other nodes providing similar functionality, such as relays which may receive data from an access point and forward the data to a UE and may implement both functionality of the UE and functionality of the access point.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Glossary
CRS Common Reference Signal
CoMP Cooperative multiple point transmission
DPS Dynamic Point Selection
ePDCCH Enhanced Physical Downlink Control Channel
JT Joint Transmission
RRC Radio Resource Control
TP Transmission Point

We claim:

1. A method, comprising:
receiving an association between physical resource block resources and at least one of a plurality of transmission points in a cooperative multipoint system, wherein receiving the association comprises receiving a common reference signal position and physical downlink control channel region for each of the plurality of transmission points, wherein the association is configured to inform a user equipment which physical resource block resources are associated with each transmission point of the plurality of transmission points; and
decoding an enhanced physical downlink control channel based on the association.

2. The method of claim 1, wherein the association is related to a search space of the enhanced physical downlink control channel.

3. The method of claim 1, the decoding comprising mapping around a plurality of common reference signal positions and physical downlink control channel regions based on the association.

4. The method of claim 1, wherein downlink control information is only accessible to a user equipment performing the decoding after the user equipment correctly decodes the enhanced physical downlink control channel.

5. A method, comprising:
  determining an association between physical resource block resources and at least one of a plurality of transmission points in a cooperative multipoint system, wherein determining the association comprises determining a common reference signal position and physical downlink control channel region for each of the plurality of transmission points, wherein the association is configured to inform a user equipment which physical resource block resources are associated with each transmission point of the plurality of transmission points; and
  transmitting the association to a user equipment wherein the association is configured to permit decoding of an enhanced physical downlink control channel on the physical resource block resources.

6. The method of claim 5, further comprising:
  transmitting, by the associated at least one of the plurality of transmission points, the enhanced physical downlink control channel on the physical resource block resources.

7. The method of claim 5, further comprising:
  partitioning physical resource blocks with at least one access point, wherein the determining the common reference signal positions and the physical downlink control channel regions is based on the partitioning.

8. The method of claim 5, further comprising:
  allocating physical resource blocks to enhanced physical downlink control channel resources, wherein the determining the common reference signal positions and the physical downlink control channel regions is based on the allocating.

9. The method of claim 5, further comprising:
  partially overlapping partitions of the physical resource blocks; and
  using the partially overlapped partitions for a joint transmission based cooperative multipoint scheme.

10. An apparatus, comprising:
  at least one processor; and
  at least one memory including computer program code,
  wherein the at least one memory and the computer program code are configured to, with the at least one processor, cause the apparatus at least to
  receive an association between physical resource block resources and at least one of a plurality of transmission points in a cooperative multipoint system, wherein reception of the association comprises receiving a common reference signal position and physical downlink control channel region for each of the plurality of transmission points, wherein the association is configured to inform a user equipment which physical resource block resources are associated with each transmission point of the plurality of transmission points; and
  decode an enhanced physical downlink control channel based on the association.

11. The apparatus of claim 10, wherein the association is related to a search space of the enhanced physical downlink control channel.

12. The apparatus of claim 10, wherein the at least one memory and the computer program code are configured to, with the at least one processor, cause the apparatus at least to
  map around a plurality of common reference signal positions and physical downlink control channel regions based on the association.

13. An apparatus, comprising:
  at least one processor; and
  at least one memory including computer program code,
  wherein the at least one memory and the computer program code are configured to, with the at least one processor, cause the apparatus at least to
  determine an association between physical resource block resources and at least one of a plurality of transmission points in a cooperative multipoint system, wherein determination of the association comprises determining a common reference signal position and physical downlink control channel region for each of the plurality of transmission points, wherein the association is configured to inform a user equipment which physical resource block resources are associated with each transmission point of the plurality of transmission points; and
  transmit the association to a user equipment wherein the association is configured to permit decoding of an enhanced physical downlink control channel on the physical resource block resources.

14. The apparatus of claim 13, wherein the at least one memory and the computer program code are configured to, with the at least one processor, cause the apparatus at least to
  transmit, by the associated at least one of the plurality of transmission points, the enhanced physical downlink control channel on the physical resource block resources.

15. The apparatus of claim 13, wherein the at least one memory and the computer program code are configured to, with the at least one processor, cause the apparatus at least to
  partition physical resource blocks with at least one access point, and
  determine the common reference signal positions and the physical downlink control channel regions based on the partitioning.

16. The apparatus of claim 13, wherein the at least one memory and the computer program code are configured to, with the at least one processor, cause the apparatus at least to
  allocate physical resource blocks to enhanced physical downlink control channel resources; and
  determine the common reference signal positions and the physical downlink control channel regions based on the allocating.

17. The apparatus of claim 13, wherein the at least one memory and the computer program code are configured to, with the at least one processor, cause the apparatus at least to
  partially overlap partitions of the physical resource blocks; and
  use the partially overlapped partitions for a joint transmission based cooperative multipoint scheme.

* * * * *